United States Patent
Buur et al.

(10) Patent No.: US 8,234,048 B2
(45) Date of Patent: Jul. 31, 2012

(54) METHOD AND SYSTEM FOR INHIBITING OPERATION IN A COMMANDED OPERATING RANGE STATE FOR A TRANSMISSION OF A POWERTRAIN SYSTEM

(75) Inventors: Hanne Buur, Brighton, MI (US); William R. Cawthorne, Milford, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 901 days.

(21) Appl. No.: 12/244,815

(22) Filed: Oct. 3, 2008

(65) Prior Publication Data
US 2009/0105914 A1    Apr. 23, 2009

Related U.S. Application Data

(60) Provisional application No. 60/981,250, filed on Oct. 19, 2007.

(51) Int. Cl.
*B60W 10/10* (2012.01)
*B60W 10/04* (2006.01)

(52) U.S. Cl. ....... 701/53; 701/22; 477/110; 180/65.265; 903/915

(58) Field of Classification Search .............. 701/53, 701/22; 477/110; 180/65.265; 903/915
See application file for complete search history.

(56) References Cited

U.S. PATENT DOCUMENTS

| | | | |
|---|---|---|---|
| 2,911,053 A * | 11/1959 | Ayers et al. | 180/273 |
| 4,829,853 A | 5/1989 | Sakaguchi | |
| 5,643,135 A * | 7/1997 | Tabata et al. | 477/154 |
| 6,188,946 B1 * | 2/2001 | Suzuki et al. | 701/62 |
| 6,832,148 B1 | 12/2004 | Bennett | |
| 6,868,318 B1 | 3/2005 | Cawthorne | |
| 7,154,236 B1 | 12/2006 | Heap | |
| 7,327,104 B2 * | 2/2008 | Uenodai et al. | 318/139 |
| 7,559,822 B2 * | 7/2009 | Byers | 446/461 |
| 2005/0029024 A1 * | 2/2005 | Takami et al. | 180/65.3 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |

(Continued)

FOREIGN PATENT DOCUMENTS

EP    1386771 A    2/2004

(Continued)

*Primary Examiner* — Mark Hellner
*Assistant Examiner* — Ari M Diacou

(57) ABSTRACT

A hybrid powertrain system includes torque generative devices to transfer power to an output member. An operator torque request, a rotational direction and speed of the output member, and a signal output from a transmission range selector are monitored. When a change in a direction of intended motion is determined, the powertrain system can change rotational direction of the output member when the speed of the output member is less than a threshold. The powertrain can inhibit a change in the rotational direction of the output member.

11 Claims, 3 Drawing Sheets

U.S. PATENT DOCUMENTS

| | | |
|---|---|---|
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0019785 A1 | 1/2006 | Holmes et al. |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah et al. |
| 2008/0119320 A1 | 5/2008 | Wu et al. |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0221763 A1* | 9/2008 | Cawthorne et al. ............ 701/62 |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah et al. |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |

| | | |
|---|---|---|
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

FOREIGN PATENT DOCUMENTS

| | | | |
|---|---|---|---|
| JP | 53089114 A | * | 8/1978 |
| WO | WO-2007006449 A | | 1/2007 |

* cited by examiner

METHOD AND SYSTEM FOR INHIBITING OPERATION IN A COMMANDED OPERATING RANGE STATE FOR A TRANSMISSION OF A POWERTRAIN SYSTEM

CROSS REFERENCE TO RELATED APPLICATIONS

This application claims the benefit of U.S. Provisional Application No. 60/981,250, filed on Oct. 19, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system is operative to monitor various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

A hybrid powertrain system includes torque generative devices operative to transfer mechanical power to an output member. The powertrain system is signally connected to an operator-selectable transmission range selector. A method for controlling the hybrid powertrain includes monitoring an operator torque request via an accelerator pedal, monitoring rotational direction and speed of the output member, monitoring a signal output from the transmission range selector including a direction of intended motion, detecting a change in the direction of intended motion from a first direction to a second direction, commanding the powertrain system to change rotational direction of the output member and operating the powertrain system to transfer torque to the output member to achieve the operator torque request when the speed of the output member is less than a predetermined threshold, and inhibiting a change in the rotational direction of the output member when the speed of the output member is greater than the predetermined threshold

BRIEF DESCRIPTION OF THE DRAWINGS

One or more embodiments will now be described, by way of example, with reference to the accompanying drawings, in which.

DETAILED DESCRIPTION

Figure 1:
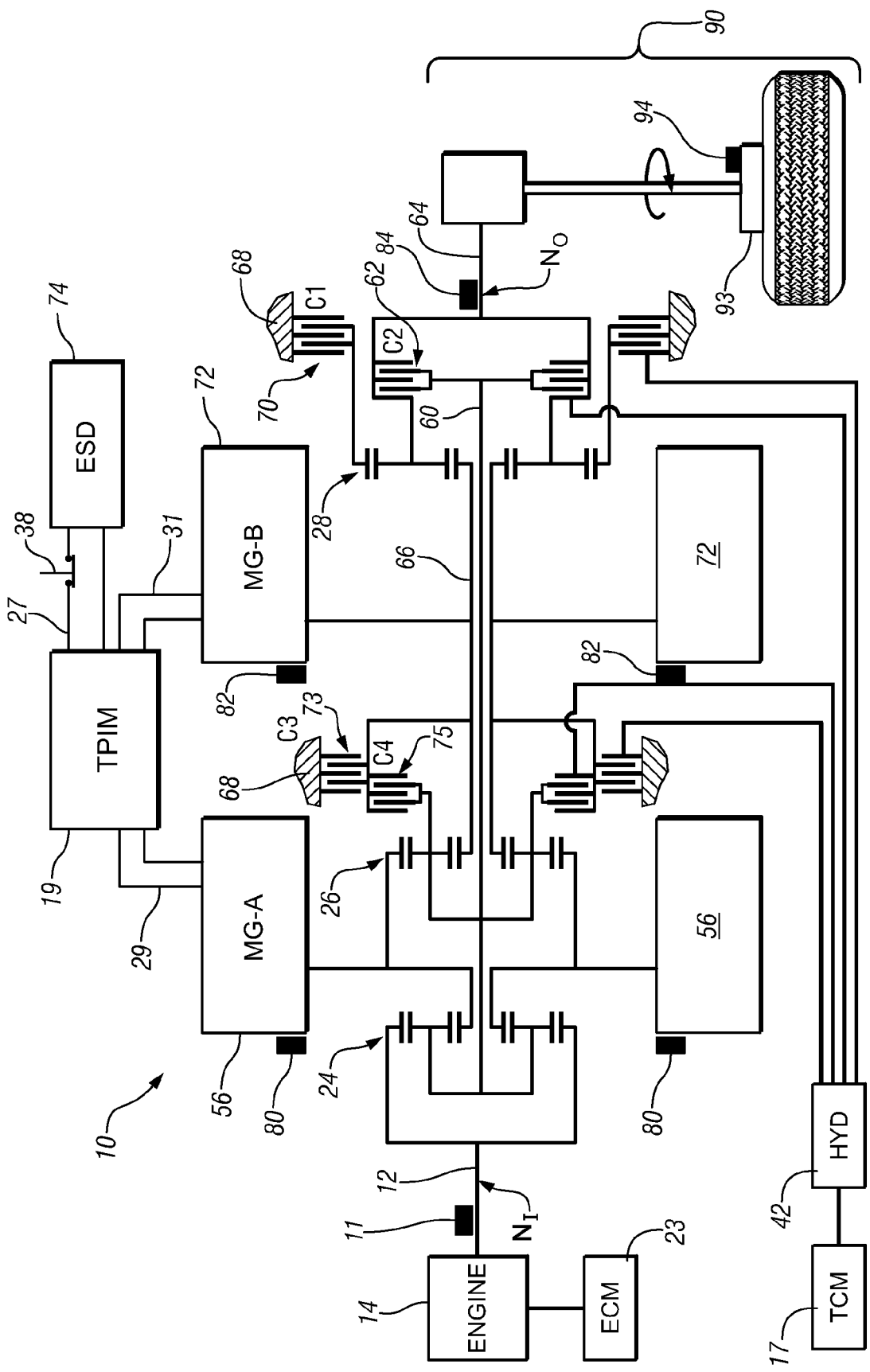
FIG. 1 is a schematic diagram of an exemplary hybrid powertrain, in accordance with the present disclosure.
Figures 2, 3:
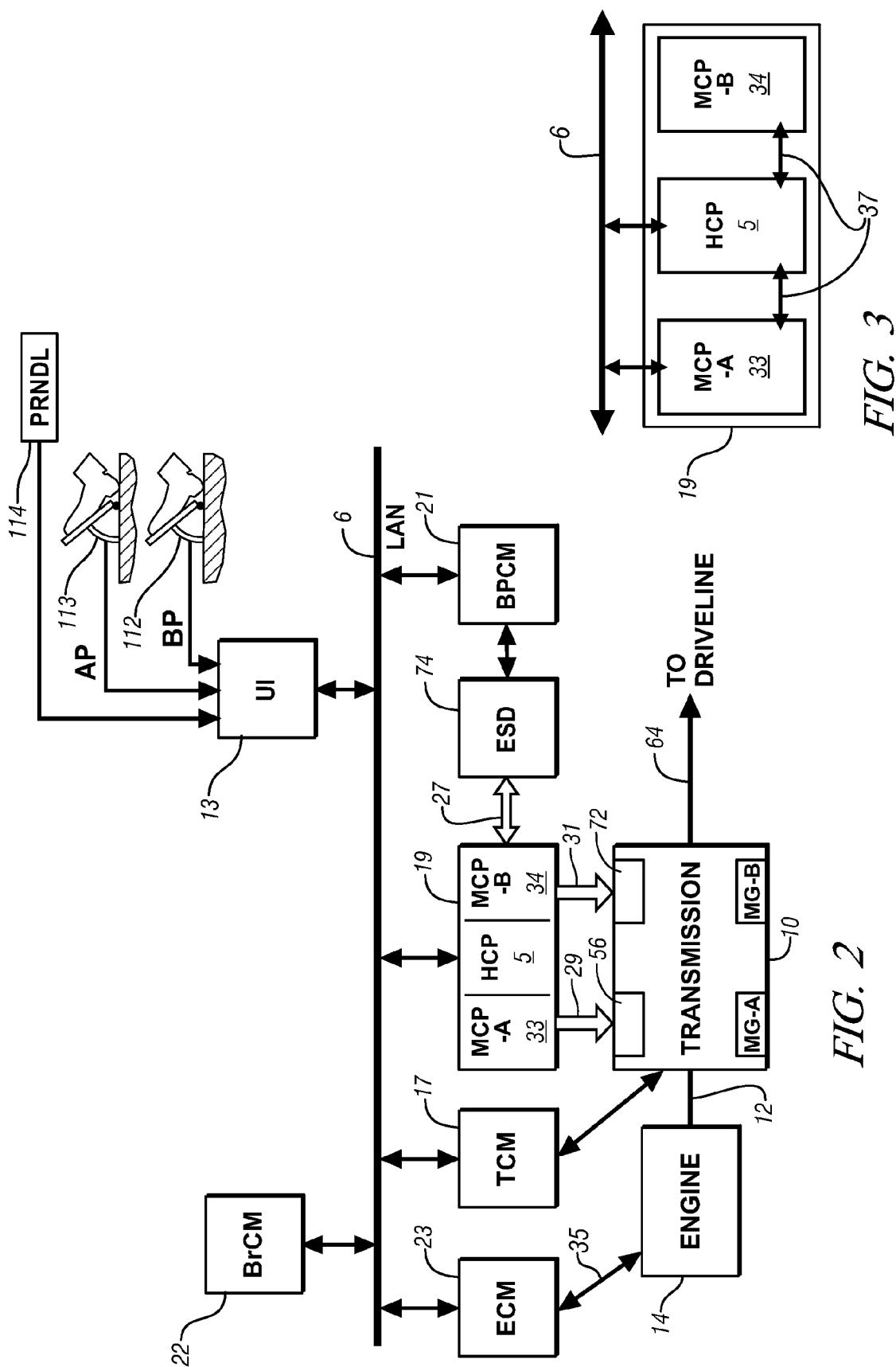
FIGS. 2 and 3 are schematic diagrams of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and engine torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 through a first motor control module ('MCP-A') 33 using transfer conductors 29, and the TPIM 19 similarly transmits electrical power to and from the second electric machine 72 through a second motor control module ('MCP-B') 34 using transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 preferably includes a hybrid control module (hereafter 'HCP') 5 and the pair of power inverters and respective motor control modules 33 and 34 configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIGS. 2 and 3 are schematic block diagrams of the distributed control module system of the control system. As used herein, the term 'control system' is defined as the control modules, wiring harnesses (not shown), communications links, sensors and actuators that monitor and control operation of the powertrain system. The control system monitors sensor inputs and commands outputs for controlling the actuators. The distributed control module system comprises a subset of overall vehicle control architecture, and provides coordinated system control of the exemplary hybrid powertrain described in FIG. 1. The control system includes the distributed control module system for synthesizing information and inputs, and executing algorithms to control actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. The HCP 5 provides supervisory control and coordination of the ECM 23, the TCM 17, the BPCM 21, and the TPIM 19. A user interface ('UI') 13 is preferably signally connected to a plurality of devices through which a vehicle operator controls, directs, and commands operation of the electromechanical hybrid powertrain. The devices include an accelerator pedal 113 ('AP'), an operator brake pedal 112 ('BP'), a transmission range selector 114 ('PRNDL'), and a vehicle speed cruise control (not shown). The transmission range selector 114 preferably has a discrete number of operator-selectable positions, including the rotational direction of the output member 64 to enable one of a forward and a reverse direction. The user interface 13 can comprise single device, as shown, or alternatively can comprise a plurality of user interface devices directly connected to the individual control modules (not shown).

The aforementioned control modules communicate with other control modules, sensors, and actuators via a communications link comprising a local area network (hereafter 'LAN') bus 6, in this embodiment. The LAN bus 6 allows for structured communication between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communications between the MCP-A 33 and the HCP 5 and between the MCP-B 34 and the HCP 5 is preferably effected using direct links preferably comprising serial peripheral interface (hereafter 'SPI') buses 37. Communication between individual control modules can also be effected using a wireless link, e.g., a short range wireless radio communications bus (not shown).

The HCP 5 provides supervisory control of the hybrid powertrain, serving to coordinate operation of the ECM 23, TCM 17, MCP-A 33, MCP-B 34, and BPCM 21. Based upon various command signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The HCP 5 sends commands to specific control modules to effect control of the engine 14, transmission 10 and the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates control signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates actuator control signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, No, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

FIG. 3 shows details of the TPIM 19. The MCP-A 33 and the HCP 5 are preferably signally connected to the LAN 6. MCP-A 33 and MCP-B 34 are directly signally connected to the HCP 5 using first and second SPI buses 37 which are preferably dedicated, i.e., communicate exclusively between the HCP 5 and the MCP-A 33 and the HCP 5 and the MCP-B 34, respectively.

Each of the control modules ECM 23, TCM 17, HCP 5, MCP-A 33, MCP-B 34, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses 37. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12. When the transmission 10 is controlled in EVT Mode 1, the transmission 10 can be commanded to operate in the reverse direction, which is accomplished by operating the second electric machine 72 in the reverse rotational direction through its motor control module in TPIM 19.

In response to operator input via the accelerator pedal 113 and brake pedal 112 as captured by the user interface 13, the HCP 5 and one or more of the other control modules determine torque commands to control torque actuators to meet the operator torque request at the output member 64 for transference to the driveline 90. The torque actuators preferably include a plurality of torque generative devices, e.g., the engine 14 and the first and second electric machines 56 and 72 and a torque transferring device comprising the transmission 10 in this embodiment. Based upon operator commands from the user interface 13, the HCP 5 determines the operator torque request and an output torque command from the transmission 10 to the driveline 90 and actuator controls including an input torque from the engine 14, clutch torques for the torque-transfer clutches C1 70, C2 62, C3 73, C4 75 of the transmission 10 and the motor torques for the first and second electric machines 56 and 72.

Torque security of the hybrid powertrain system can be achieved by executing integrity tests of the control system which include monitoring hardware integrity, monitoring integrity of algorithms and memory devices, securing and monitoring signal integrity during communications within a control module and communications between the control modules, monitoring processor integrity and executing remedial actions. Torque security in presence of an observed fault can include limiting an actuator command signal. This can include maximum and minimum limits on actuator command signals, and maximum rates of change on actuator command signals. Specifically, motor torque commands $T_A$ and $T_B$ can be limited to maximum and minimum motor torques, and changes in the motor torque commands $T_A$ and $T_B$ can be limited to effect a maximum rate of change in output torque, e.g., 0.2 g.

Securing and monitoring signal integrity is preferably accomplished by individually securing the control modules and securing the serial communications links between the control modules. The distributed control module system of the exemplary embodiment preferably includes each of the torque actuators controlled by a separate control module. This embodiment includes the ECM 23 that monitors sensors and control actuators of the engine 14, the TCM 17 that monitors sensors and control actuators of the transmission 10, the MCP-A 33 that monitors sensors and control actuators of the first electric machine 56, and the MCP-B 34 that monitors sensors and control actuators of the second electric machine. The HCP 5 monitors inputs from and commands operation of the ECM 23, TCM 17, MCP-A 33 and MCP-B 34. Each of the ECM 23, MCP-A 33, MCP-B 34 and TCM 17 is responsible for closed loop monitoring and self-security based on secured commands received from the HCP 5.

Integrity of other hardware can be determined using diagnostics software that monitors data internal to the control module, and rationalizing it in one of the loop cycles. When an inconsistency between monitored data and rationalized data is detected, the inconsistency is recorded as a mismatch count in a fault maturation algorithm, e.g., an X of Y routine wherein a fault is detected when X mismatches are observed out of immediately preceding Y observations. An example is a fault is detected when more than half the immediately preceding observations are mismatches occurring between the monitored data and the rationalized data. When the fault maturation algorithm achieves a threshold number of mismatching observations a fault will be set and a remedial action taken. The remedial action can be actuator-specific or across the entire control system, and preferably places the powertrain in a torque-safe state. The remedial action will also include storing an OBD compliant code for subsequent retrieval. A diagnostic may preliminarily identify a fault pending, meaning an inconsistency has been detected but the fault maturation algorithm has not reached its threshold. The hardware integrity can be further determined using diagnostics software that monitors the sensors and actuators of the control system.

Other torque security actions can include limiting an actuator command signal. This can include maximum and minimum limits on actuator command signals, and maximum rates of change on actuator command signals. Specifically, motor torque commands $T_A$ and $T_B$ can be limited to maximum and minimum motor torques, and changes in the motor torque commands $T_A$ and $T_B$ can be limited to maximum rate of change, e.g., 0.2 g.

The transmission range selector 114 comprises an operator-manipulated device operative to be placed in one of a plurality of discrete positions, e.g. Park, Reverse, Neutral, Drive, and Low ('PRNDL'). Preferably there are two range selector lever position sensors (not shown) that are attached to the transmission range selector 114, each comprising a digital encoder that provides discrete output signals corresponding to the discrete positions. Individual positions for each of the discrete positions are typically identified by mechanical detents (not shown) in the transmission range selector 114. The range selector lever position sensors are operative to detect and discern distinct range selector positions and are preferably permanently mechanically aligned with each other to prevent misalignment of the two sensors. Preferably the first sensor (not shown) comprises a digital encoder that provides a unique set of discrete outputs for each discrete position of the transmission range selector 114. In one embodiment, the first sensor is referred to as a Range Encoder. Preferably, the second sensor (not shown) comprises a digital encoder that provides a unique set of discrete outputs for each of a plurality of valid subsets of the discrete positions, with each subset comprising a rotational direction of the output member 64 of the transmission 10 corresponding to an operator-selected direction of intended vehicle propulsion. In this embodiment there are four subsets, comprising four unique outputs corresponding to one of the Park, Reverse, Neutral, and Drive positions. In one embodiment, the second sensor is referred to as a Direction Encoder. The control system determines an operator command for a transmission range and rotational direction of the output member 64 based upon inputs from sensors of the transmission range selector 114.

The rotational speed of the output shaft 64 is preferably monitored using the sensor 84 comprising a sensing system including a multi-tooth wheel and a sensing element (not shown). The multi-tooth wheel is preferably rotatably attached to the output shaft 64 and comprises a device having a plurality of teeth and corresponding detents that are located around a circumference thereof. The sensing element preferably comprises a Hall-effect sensing device mounted in a fixed location adjacent the multi-tooth wheel. The sensing element is operative to sense the teeth and corresponding detents in the multi-tooth wheel as the output shaft 64 rotates, and generate an electrical pulse signal at each transition in the wheel between a tooth and a detent. Rotational speed is determined based upon the number of electrical pulses generated by the sensor over a predetermined elapsed period of time, which is interpretable by a control module, in this embodiment the TCM 17. The sensing element is preferably configured to generate the electrical pulse output such that rotational direction can be interpreted therefrom. In the embodiment described, when the output shaft 64 is rotating in a direction resulting in forward propulsion of the vehicle, the electrical pulse has a duration of approximately 45 microseconds. When the output shaft 64 is rotating in a direction resulting in reverse propulsion of the vehicle, the electrical pulse has a duration of approximately 180 microseconds. Thus, the TCM 17 monitors duration of one or more signal pulses to determine rotational direction of the output shaft 64.

During ongoing operation of the powertrain, the control system monitors the operator torque request and the rotational direction and speed of the output member 64 and the signal outputs from the transmission range selector 114 comprising the commanded range and the commanded direction of intended vehicle propulsion.

When the control system detects a change in the commanded direction at the transmission range selector 114 from a first direction to a second direction, e.g., from intended propulsion in the forward direction to intended propulsion in the reverse direction, the control system executes different courses of action depending upon the operator torque request and the vehicle speed.

Detecting a change in the commanded direction at the transmission range selector 114 from the first direction to the second direction includes verifying the command to change direction. Verifying the command to change direction can include comparing signal outputs from the Direction Encoder and the Range Encoder of the transmission range selector 114 for consistency. Verifying the command to change direction can include verifying present direction of the output shaft 64. This includes monitoring the output of the transmission output speed sensor 84 as described hereinabove.

Monitoring speed of the output member 64 includes monitoring the rotational speeds of the first and second electric machines 56 and 72, i.e., $N_A$ and $N_B$ using resolvers 80 and 82, and calculating rotational speed of the output member 64 based upon the operating range state of the transmission 10. Alternatively, or in combination, wheel speeds of one or more of the wheels 93 can be monitored using sensor 94 to measure and calculate rotational speed of the output member 64. The redundantly calculated rotational speed can be rationalized with the measured speed of the output member 64 using the sensor 84. When wheel speeds are monitored using the wheel speed sensor 94, the sensor 84, and the resolvers 80 and 82, an active fault in any of the sensors can be mitigated and rotational speed of the output member 64 can be determined based upon the active, non-faulted sensors. When the calculated rotational speed is within a predetermined range of the measured speed taking into account any clutch slippage, the speed of the output member 64 is verified, and is determined to be the maximum of the calculated and measured speeds.

When the speed of the output member 64 is less than a predetermined threshold, e.g., 10 km/h, and the command to change direction has been verified, the control system commands the powertrain system to change rotational direction of the output member 64 and operate the powertrain system to transfer torque to the output member 64 to achieve the operator torque request. This includes controlling rotational directions of the first and second electric machines 56 and 72 and controlling applications of the clutches C1 70, C2 62, C3 73, and C4 75 to effect the change in rotational direction of the output member 64 in response to the commanded change in direction. In this operation, the operator torque request can increase, decrease, or remain unchanged depending upon operator input to the accelerator pedal 112, but the rotational direction in which the output torque is applied changes. Thus, an operator torque request of 30 Nm may go from a torque request for propulsion at 30 Nm in the forward direction to a torque request for propulsion at 30 Nm in the reverse direction. The change in the torque request from forward propulsion to reverse propulsion is preferably gradually ramped down over a period of time as a function of vehicle speed.

Figure 4:
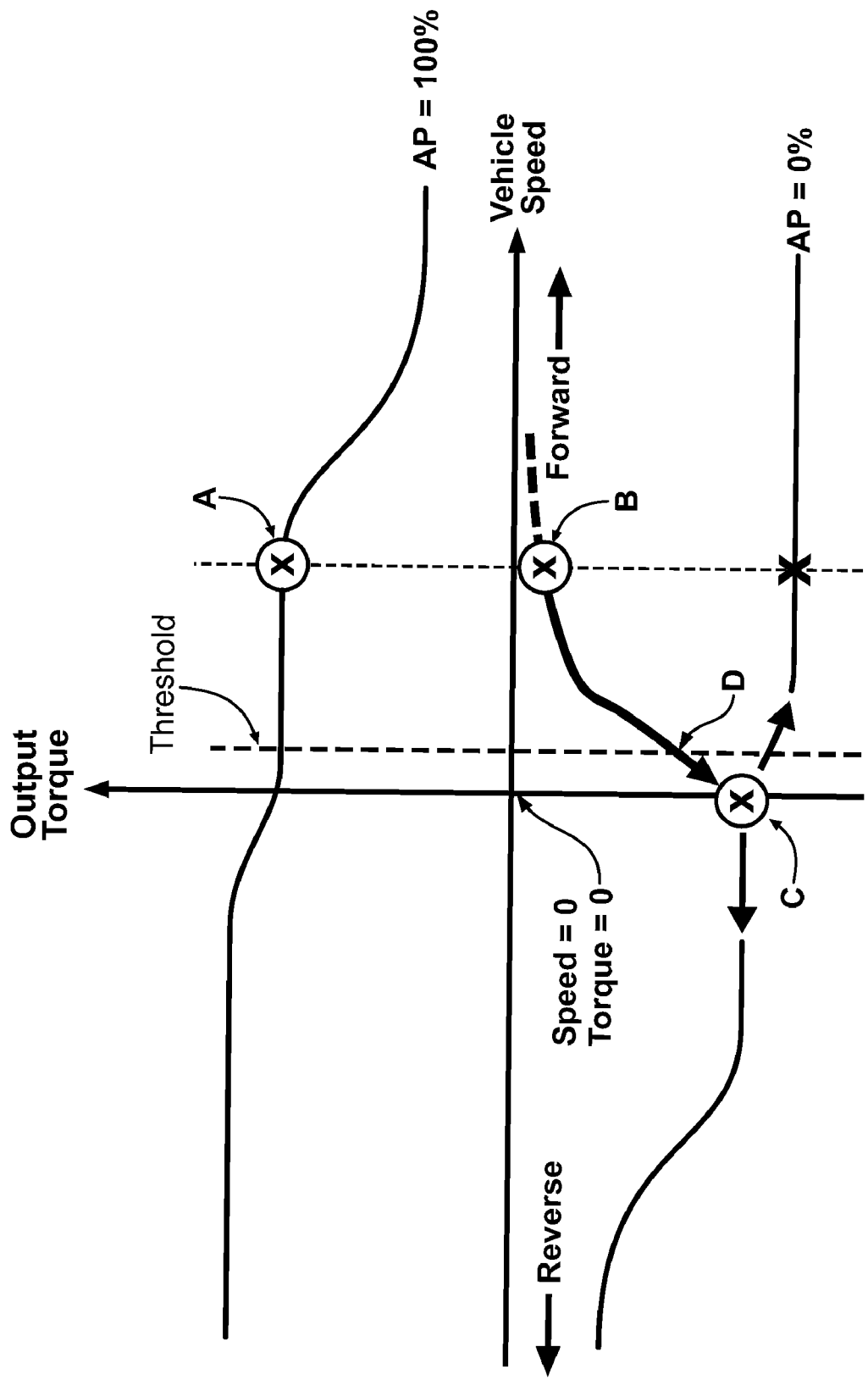
FIG. 4 is a graphical depiction, in accordance with the present disclosure.

When the speed of the output member 64 is greater than the predetermined threshold and the command to change direction has been verified, a change in the rotational direction of the output member is inhibited. Furthermore, powertrain operation is controlled to reduce torque transferred to the output member 64. This is depicted with reference to FIG. 4. FIG. 4 graphically depicts output torque of the transmission 10 ("Output Torque") plotted as a function of vehicle speed ('Vehicle Speed') for an accelerator pedal 112 input ranging from no pedal ('AP=0%') to a fully depressed pedal ('AP=100%') illustrative of the operation of the powertrain system described hereinabove. A predetermined speed threshold ('Threshold') is shown for forward vehicle speed. The vehicle is operating at an initial operating condition ('A') an output torque and output speed that is in response to the accelerator pedal position, and is greater than the threshold. When a command to change direction has been verified, the control system acts to reduce transmission output torque to a negative output torque ('B'), thus creating a drag on the driveline 90 and wheels 93 with the vehicle operating in the forward direction. The negative torque or drag on the driveline 90 can be created by reacting torque through the first and second electric machines 56 and 72 and regeneratively recovering some of the forward kinetic energy as stored power in the ESD 74, and/or controlling engine operation to idle or controlling engine operation to the engine off state. The negative torque is initially of a magnitude sufficient to slow the vehicle speed without causing vehicle instability. The magnitude of the negative torque preferably increases to slow the vehicle speed until vehicle speed reaches 0 km/h ('C'). Alternatively, the magnitude of the negative torque increases to slow the vehicle speed until vehicle speed reaches a predetermined speed threshold km/h ('D'), at which time the control system commands the powertrain system to change rotational direction of the output member 64 and operate the powertrain system to transfer torque to the output member 64 to achieve the operator torque request in the direction commanded by the transmission range selector 114.

When the transmission range selector 114 is in a forward range position, e.g., DRIVE, the accelerator pedal 113 is at 0%, and the vehicle speed is 0 mph, there is a positive powertrain output torque to a vehicle wheel sufficient to permit vehicle creep, i.e., minimal forward propulsion. As vehicle speed increases, the output torque decreases. At a second vehicle speed, the output torque is zero. Above the second vehicle speed, the output torque is negative, by which the powertrain output torque goes negative and places a drag on the vehicle wheel. When the transmission range selector 114 is in the forward range position, e.g., DRIVE, the accelerator pedal 113 is at 0%, and the vehicle speed is negative, there is positive powertrain output torque to the vehicle wheel to counteract vehicle rollback. The powertrain output torque increases with increasingly negative vehicle speed.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling a hybrid powertrain system including torque generative devices operative to transfer mechanical power to an output member, the powertrain system signally connected to an operator-selectable transmission range selector, the method comprising:

monitoring an operator torque request via an accelerator pedal;

monitoring rotational direction and speed of the output member;

monitoring a signal output from the transmission range selector comprising a direction of intended motion;

detecting an operator-commanded change in the direction of intended motion from a first direction to a second direction when the operator torque request is a non-zero value;

commanding the powertrain system to change rotational direction of the output member and operating the powertrain system to transfer torque to the output member to achieve the operator torque request when the speed of the output member is less than a predetermined threshold; and inhibiting a change in the rotational direction of the output member when the speed of the output member is greater than the predetermined threshold.

2. The method of claim 1, wherein inhibiting the change in the rotational direction of the output member when the speed of the output member is greater than the predetermined threshold further comprises reducing the torque output to the output member when the speed of the output member is greater than the predetermined threshold.

3. The method of claim 1, wherein inhibiting the change in the rotational direction of the output member when the speed of the output member is greater than the predetermined threshold further comprises reacting torque through the torque generative devices to generate a negative output torque to the output member coincident with the inhibiting the change in the rotational direction of the output member when the speed of the output member is greater than the predetermined threshold.

4. The method of claim 3, further comprising subsequently commanding the powertrain system to change the rotational direction of the output member and operating the powertrain system to transfer torque to the output member to achieve the operator torque request when the speed of the output member is less than the predetermined threshold.

5. A method for controlling a hybrid powertrain system including torque generative devices operative to transfer mechanical power to an output member, the powertrain system signally connected to an operator-selectable transmission range selector, the method comprising:

monitoring an operator torque request;

monitoring rotational direction and speed of the output member;

monitoring signal outputs from the transmission range selector comprising a range and a direction of intended motion;

detecting operator command to change the direction of intended motion from a first direction to a second direction coincident with a non-zero operator torque request;

verifying the command to change the direction of intended motion from the first direction to the second direction in response to the monitored signal outputs from the transmission range selector comprising a range and a direction of intended motion; and inhibiting changing the rotational direction of the output member and reducing torque transferred to the output member when the speed of the output member is greater than a predetermined threshold.

6. The method of claim 5, further comprising commanding the powertrain system to change rotational direction of the output member and operating the powertrain system to transfer torque to the output member to achieve the operator torque request when the speed of the output member is less than the predetermined threshold.

7. The method of claim 5, wherein reducing torque transferred to the output member when the speed of the output member is greater than the predetermined threshold comprises controlling the torque generative devices to generate a negative output torque to the output member when the speed of the output member is greater than the predetermined threshold.

8. A method for operating a powertrain system including an engine and a torque generative device operatively connected to a transmission, to transfer power to a driveline, the powertrain system signally connected to an operator-selectable transmission range selector, the method comprising:

monitoring an operator torque request via an accelerator pedal;

monitoring rotational direction and speed of the driveline;

monitoring signal outputs from the transmission range selector comprising a range and a direction of intended motion of the driveline;

detecting an operator command to change the direction of intended motion of the driveline from a first direction to a second direction when the operator torque request is a non-zero value;

comparing the signal outputs from the transmission range selector comprising the range and the direction of intended motion of the driveline to verify the command to change the direction of intended motion of the driveline from the first direction to the second direction; and inhibiting changing the direction of intended motion of the driveline and reducing power transferred to the driveline when the speed of the driveline is greater than a predetermined threshold.

9. The method of claim 8, further comprising commanding the powertrain system to change rotational direction of the driveline and operating the powertrain system to transfer power to the driveline to achieve the operator torque request when the speed of the driveline is less than the predetermined threshold in response to the verified command to change the direction of intended motion of the driveline from the first direction to the second direction.

10. The method of claim 8, wherein reducing power transferred to the driveline when the speed of the driveline is greater than the predetermined threshold comprises controlling the torque generative device to react torque through the driveline when the speed of the driveline is greater than the predetermined threshold.

11. The method of claim 1, wherein detecting the operator-commanded change in the direction of intended motion from the first direction to the second direction when the operator torque request is a non-zero value further comprises verifying the operator-commanded change in the direction of intended motion from the first direction to the second direction prior to commanding the powertrain system to change the rotational direction of the output member.

* * * * *